3,123,282
IMPELLER BRAKE
Gerard T. Pothier, Pawcatuck, and Daniel P. McGrath, Stonington, Conn., assignors to General Dynamics Corporation, New York, N.Y., a corporation of Delaware
Filed Feb. 15, 1962, Ser. No. 173,507
7 Claims. (Cl. 230—114)

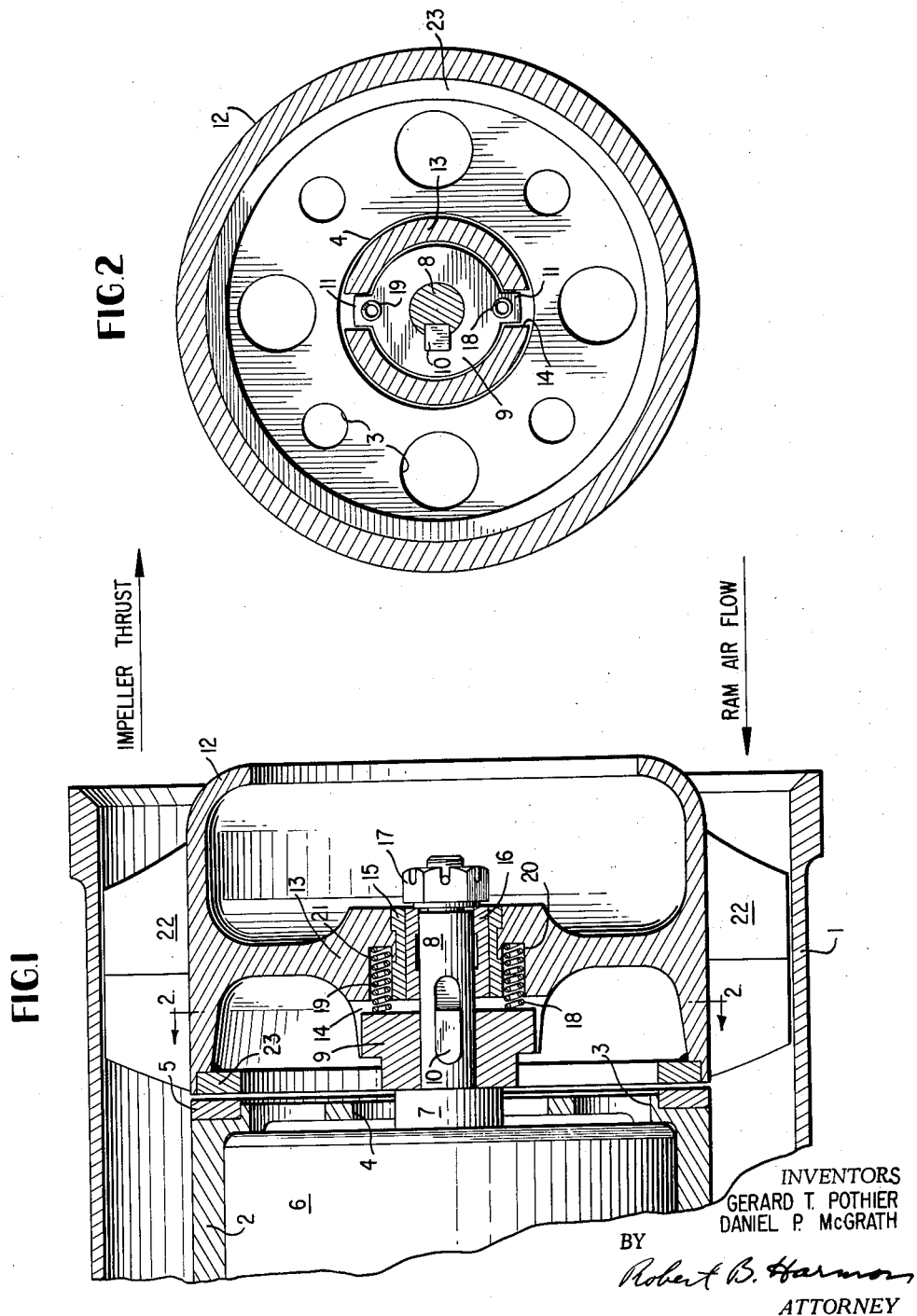

The present invention relates more specifically to braking means, finding special utility under conditions where a rotating impeller may become subjected to a higher fluid pressure on the upstream side than that existing on the downstream side, commonly referred to as ram air pressure. Under certain operating conditions, it is not only desirable but necessary to uncouple or de-energize the driven impeller once the unit has been subjected to ram air force and then to utilize some means for braking the impeller unit against rotation by the force of the ram air flow. The purpose for retarding or completely stopping the rotation of the impeller is to prevent what is known in the art as "windmilling" or free rotational motion of the impeller blades above safe bearing design speeds which would result in overheating or ultimate destruction of the bearing structure as well as damage to the normal driving unit for the impeller blades. It may also be desirable to utilize the braked impeller blade as an impedance to the flow of the working medium past the impeller blades.

The problem, which has been outlined, occurs most naturally in the use of cooling fans or blowers for various parts of high speed aircraft where it is necessary to de-energize the fan when the aircraft is in flight and to utilize the ram air in place of the fan or blower. At the same time it is necessary to prevent damage to the fan or to provide an impedance to the air flow. Such an application is not necessarily limited to aircraft, but has a broad application to any moving vehicle having a blower system subjected to ram air under any conditions. The present invention also finds utility in multistage compressor units when it is desirable to render certain of the compressing stations inoperative to vary the overall output of the entire compressor for any purpose. In this latter operation, the inoperative sections, although in a de-energized condition, will be subjected to the high pressure fluid stream of the other compressing sections.

In the prior art it has been necessary to employ an electro mechanical motor brake or some similar outside force to brake the de-energized impeller which has been subjected to ram air force. The disadvantages experienced by the prior art methods are the expense of additional braking mechanism and power requirements therefor, along with the need for additional space requiring modifications of the original impeller and power unit. The prior art has also experienced the need for larger and heavier motor units for the impeller along with higher design speeds to withstand the ram air force. The present invention contemplates the elimination of these problems by the use of natural phenomena which normally occur when any piece of rotating power driven equipment is situated in a fluid stream subject to ram air force. The principles of the present invention enable the ram air flow pressure itself to provide the braking force for the impeller unit once the unit has reached a predetermined speed. After the impeller has reached the predetermined maximum speed, any increase in ram air pressure will result in a complete braking of the impeller and, consequently, upon decrease of ram air pressure the natural axial impeller thrust, assisted by spring action, will disengage the braking surfaces.

This invention has, therefore, the primary object of presenting a ram air pressure responsive braking arrangement for motor driven impellers.

A further object of the present invention is to provide an automatic braking arrangement for impeller blades which is actuated at a predetermined ram air pressure to brake the impeller, and which is automatically released upon a drop in ram air pressure by the natural thrust of the rotating impeller assisted by spring pressure.

Another object of the present invention is to provide an automatic braking arrangement for a motor driven axial flow compressor wherein the braking surfaces are mounted directly on the motor casing and the compressor rotor member respectively, and are actuated and released by means of axial movement between the braking surfaces.

Another object of the present invention is to provide a simplified construction for an axial flow compressor braking device by eliminating the need for auxiliary braking force and apparatus and thereby permit a lightweight and inexpensive construction.

A still further object of the present invention is to provide an impeller brake which enables the braked impeller to be utilized as an impedance to the flow of air past the impeller.

The means by which the foregoing objects and other advantages, which will be apparent to those skilled in the art, are accomplished, are set forth in the following specification and claims and are illustrated in the accompanying drawings dealing with a preferred embodiment of the present invention. Reference is made now to the accompanying drawings in which:

FIGURE 1 is a vertical cross-sectional view of the impeller unit mounted within an air flow passage.

FIGURE 2 is a cross-sectional view of the impeller mounting taken along lines 2—2 of FIGURE 1.

Referring now to the drawings wherein like reference numerals are used to indicate identical parts in the various views, the preferred embodiment of the present invention comprises an air flow conduit or housing 1 and a motor support casing 2 centrally supported within the housing by any suitable means, not shown. The support casing 2 is rigidly fixed with relation to the housing 1, and further includes a front facing portion integral therewith provided with circumferentially spaced air vents 3 and an enlarged central aperture 4. An annular friction ring 5 is carried by the outer periphery of the motor support casing and is rigidly affixed thereto. The friction ring 5 may be composed of any suitable friction material capable of withstanding braking pressures exerted thereon which will be presently described. An electric motor 6 is received and supported within the support casing 2 and includes a rotatable output shaft 7 extending through the central aperture 4 of the casing. The shaft 7 includes a reduced diameter portion 8 to provide a mounting surface for the driven impeller.

A driving ring 9 is tightly fitted to the shaft 8 and is keyed for rotation therewith by key member 10. The driving ring 9 may be composed of Teflon or any other suitable material and further includes radially extending driving lugs 11, two of which are shown in FIGURES 1 and 2. The rotatable impeller includes a hollow cylindrical hub 12 mounted on the forward portion of the shaft 8 by means of a centrally located mounting structure 13 which surrounds the shaft 8 and includes a rearwardly extending hollow portion which surrounds the ring 9 and is provided with slotted portions 14 for the reception of the lugs 11. The mounting structure 13 of the hub is equipped with metallic bushings 15 and 16 which may be made from a material such as bronze or the like with enough clearance being maintained between the bushing 16 and the drive shaft 8 to enable the hub 12 to shift axially on the shaft 8 between the position shown in FIGURE 1 against a screw threaded stop member 17 and a rearward braking position adjacent the driving ring 9.

Compression springs 18 and 19 are seated within cavities 20 and 21 respectively, within the mounting structure 13 and bear against the driving lugs 11 on the ring member 9. With this arrangement the hub 12 is driven by the driving lugs 11 but yet is allowed to shift axially on shaft 8, between the limits described, by reason of the slotted portions 14. The spring members 18 and 19 maintain a constant bias on the hub 12 in a direction away from the driving ring 9.

The impeller hub 12 further includes any form of conventional impeller blades 22, two of which are shown in FIGURE 1. As the impeller hub 12 is rotated by means of the motor and drive shaft, the impeller blades 22 are designed to direct a stream of air flow rearwardly about the motor support casing 2. To complete the structure of the present invention, a second friction ring 23 is rigidly affixed to the rearwardly extending flange portion of the hub 12 in opposing faced relationship with the friction ring 5 of the motor support casing 2. The friction ring 23 may be composed of any suitable material designed to co-act with the friction ring 5 to produce a frictional braking engagement when pressured thereagainst. As shown in FIGURE 1, the friction surface of the ring 23 may be flush with the rear face of the flange of hub 12.

During normal operations, the impeller unit will be rotated within the housing 1 by means of its connection with the motor unit 6 to direct a flow of air or other fluid to the left as viewed in FIGURE 1, rearwardly through the conduit. This is the normal or conventional operation of an impeller unit and during such operation, it is a well known phenomenon that a forward thrust is imparted to the impeller in the direction of the arrow and notation according to FIGURE 1, under these conditions the friction rings 5 and 23 will be out of contact and the springs 18 and 19 will be relieved of any pressure. The fluid pressure on the downstream or lefthand side of the impeller shown in FIGURE 1 will be greater than that on the upstream or right side of the impeller. The relative position of the various elements of the device under these conditions is clearly shown in FIGURE 1.

When an impeller unit, such as the present device, becomes subject to ram air flow either under conditions of aerial flight or a ram air condition created by other impeller units, the fluid medium on the upstream side of the impeller unit will actually exceed that on the downstream side. Under these conditions, the force of the ram air, in the direction indicated by the arrow and notation in FIGURE 1, will actually drive the impeller and usually at a much greater speed than that for which the electrical motor or a bearing structure of the impeller is designed. It is under these conditions that the problem of "windmilling" arises and some form of braking means must be utilized to retard or completely stop the rotation of the impeller to prevent damage or complete destruction of the electrical motor and bearing structure. With the use of the present device, the motor 6 will be manually or automatically de-energized once the ram air flow starts or after it has reached a predetermined force, thus allowing the impeller free rotation subject to the force of the ram air flow. As long as the rotational speed of the impeller is below a predetermined safe maximum the natural thrust of the rotating impeller in the direction indicated by the arrow in FIGURE 1, assisted by the precalibrated springs 18 and 19, will maintain the impeller unit in substantially the position shown in FIGURE 1, with the braking rings 5 and 23 out of contact. Should the ram air pressure increase beyond this point, the force created thereby will overcome the resistance of the impeller thrust and the bias of springs 18 and 19 and shift the impeller unit 12 to the left as viewed in FIGURE 1, thus engaging the braking rings 5 and 23 to maintain a frictional drag on the impeller unit or bring the impeller unit to a full stop, should the ram air pressure increase further. With this type of operation, it will readily be understood that the purpose of the automatic braking device of the present invention is not limited to the prevention of failure of the impeller bearings and the electrical motor, but may also be utilized to maintain a reduced weight flow of air past the impeller, once the braking action begins. In practice, the compression springs 18 and 19 will be precalibrated to control the desired maximum rotational speed of the impeller for which the braking action will occur.

Should the ram air pressure decrease below that required to actuate the braking elements 5 and 23, or in the event that the ram air pressure is completely removed and the motor unit 6 is energized, the return action of the compression springs 18 and 19, assisted by the axial thrust created by the rotating impeller will return the impeller unit 12 to the position illustrated in FIGURE 1, with the braking surfaces 5 and 23 out of contact. It will be thus understood by those skilled in the art that the present invention presents a much simplified form of automatic braking action for impeller units subjected to ram air pressure, while accomplishing the stated purpose in an efficient manner. The present invention makes it possible to utilize the natural forces existing under ram air pressure conditions to automatically set the impeller brake thus eliminating auxiliary brake actuating units and controls therefor.

It will be readily apparent to those skilled in the art that the present invention provides novel and useful improvements in impeller braking arrangements. The arrangements and types of structural components utilized in this invention may be subject to numerous modifications well within the purview of this invention and the applicant intends only to be limited to a liberal interpretation of the specification and appended claims.

Having thus described the invention, what is claimed as new and desired to be secured by Letters Patent is:

1. A fluid medium impeller system comprising;
   (a) a fluid flow conduit
   (b) a selectively operable motor mounted in said conduit,
   (c) said motor including a rotatable power shaft,
   (d) a driving ring keyed to said shaft,
   (e) stop means carried by said shaft and spaced from said ring,
   (f) an impeller slidably mounted on said shaft for axial movement between a first position against said stop means and a second position against said ring,
   (g) means carried by said impeller to continuously engage said ring to be driven thereby,
   (h) spring means acting between said ring and said impeller to maintain said impeller against said stop,
   (i) a first friction ring carried by said motor,
   (j) and a second friction ring carried by said impeller and adapted to engage said first friction ring when said impeller is shifted to said second position in response to a predetermined fluid flow pressure acting on the upstream side of said impeller.

2. In a fluid medium impeller system having a fluid flow conduit, a rotatable impeller mounted therein, and a driving motor connected to the downstream side of said impeller, the combination comprising;
   (a) means to mount said impeller in axially shiftable relationship with said motor,
   (b) a first friction surface on said motor,
   (c) a second friction surface on said impeller and located in facing relation to said first friction surface,
   (d) means acting between said motor and said impeller to resiliently bias said second friction surface out of contact with said first friction surface,
   (e) and fluid flow pressure means on the upstream side of said impeller constituting the sole means for overcoming said resilient bias to engage said friction surfaces to thereby brake said impeller.

3. In a fluid medium impeller system, the combination comprising;
   (a) a fluid flow conduit, (b) an impeller mounted for rotation in said conduit,
(c) means to selectively drive said impeller in one direction to induce a flow of the fluid medium through said conduit, whereby the fluid flow pressure on the downstream side of said impeller is greater than the fluid flow pressure on the upstream side,
(d) braking means carried by said impeller and said drive means,
(e) and means providing for actuation of said braking means in response to a predetermined increase of fluid flow pressure on the upstream side of said impeller above the fluid flow pressure existing on the downstream side thereof.

4. A braking arrangement for a fluid medium impeller system comprising;
(a) a rotatable impeller
(b) a first braking surface located on the downstream side of said impeller,
(c) a driving motor located on the downstream side of said impeller and connected to rotate said impeller,
(d) a second braking surface on said motor in facing relation with said first braking surface,
(e) means to shiftably mount said impeller with relation with said motor whereby the axial thrust on said rotating impeller will maintain said braking surfaces out of contact,
(f) and means to resiliently bias said impeller in the direction of said axial thrust, whereby fluid flow pressure on the upstream side of the impeller constitutes the sole means to overcome said thrust and said bias to engage said braking surfaces.

5. In combination with a pressurized fluid conduit;
(a) an axial flow compressor and a stationary motor structure therefor,
(b) mounting means to shiftably mount said compressor with relation to said motor,
(c) means to bias said compressor to an operative extended position away from said motor structure,
(d) said mounting means providing for axial movement of said compressor to a retracted braked position against the stationary motor structure in response to a predetermined fluid pressure flow great enough to overcome the bias thereon.

6. The combination according to claim 5 wherein;
(a) said means to bias said compressor includes a spring member acting between said compressor and the motor,
(b) and said fluid pressure flow constitutes the sole means for moving said compressor against said bias.

7. A fluid medium impeller system comprising;
(a) a fluid flow conduit,
(b) motor means mounted in said conduit including a rotatable drive shaft,
(c) an impeller,
(d) means to drivingly mount said impeller on said shaft for free axial shifting between a first extreme position away from said motor means and a second extreme position toward said motor means,
(e) biasing means to constantly urge said impeller into said first extreme position,
(f) a first stationary friction ring in said conduit,
(g) and a second friction ring carried by said impeller and adapted to engage said first friction ring when said impeller is shifted to said second extreme position in response to a predetermined fluid flow pressure acting on the upstream side of said impeller.

References Cited in the file of this patent
UNITED STATES PATENTS

| | | |
|---|---|---|
| 1,847,764 | Kindl | Mar. 1, 1932 |
| 2,550,111 | Else | Apr. 24, 1951 |

FOREIGN PATENTS

| | | |
|---|---|---|
| 874,318 | France | Oct. 4, 1942 |
| 557,934 | Great Britain | Dec. 13, 1943 |